July 28, 1964 F. H. EDWARDS 3,142,526

MOUNTING MEANS FOR A TUBE SOCKET

Filed Sept. 6, 1961

INVENTOR.
FRANK H. EDWARDS

BY John Todd

ATTORNEY

United States Patent Office 3,142,526

Patented July 28, 1964

3,142,526

MOUNTING MEANS FOR A TUBE SOCKET

Frank H. Edwards, Ancaster, Ontario, Canada, assignor to United-Carr Fastener Corporation, Boston, Mass., a corporation of Delaware Filed Sept. 6, 1961, Ser. No. 136,229
2 Claims. (Cl. 339—126)

Figure 1:
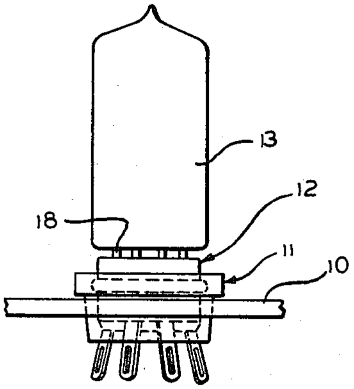

This invention relates to a mounting arrangement for tube sockets and similar structures, and more particularly to a component for mounting a tube socket upon a chassis element.

The type of tube socket for which the mounting arrangement is primarily intended comprises those which are referred to generally as "moldings" and are usually relatively rigid elements molded from thermosetting resin plastic materials having good dielectric properties. Conventionally, such sockets are mounted upon chassis elements through the intermediate agency of a metal saddle which is crimped about or otherwise secured to the socket and is then riveted to the chassis. In certain instances, particularly where the chassis is a printed wire board or similar conductor-equipped member, arrangements have been proposed which enable the socket to be snapped into place in an opening therefor in such chassis member and to be anchored in such position by locking fingers, etc., usually carried by the socket.

An object of the present invention is to provide a mounting arrangement for tube sockets and the like that obviates many of the disadvantages connected with the use of saddles and "snap-in" fastener means heretofore employed.

Another object of the invention is in the provision of a mounting component for mounting a tube socket or the like upon a chassis, and which is usable without change or alteration with chassis of various thickness.

Still another object is that of providing a mounting component for a tube socket or the like, which automatically secures such socket within an opening provided therefor in a chassis element upon insertion of a socket-equipped mounting component thereinto, and which accomplishes this result without distortion of the socket and pin center diameter thereof.

A further object of the invention is to provide a mounting component of the character described, that negates the need for rivets, bolts, and analogous fasteners for securing the component to either a chassis or socket, and in which the material from which the mounting component is made is not limited by the electrical or mechanical requirements of the tube socket since the component is used simply for mounting such socket; the component nevertheless being usually formed of an insulating material and being effective therefore to increase the voltage rating and insulation resistance between the conductive parts of the tube socket and chassis.

Still a further object is in the provision of a mounting component of the type described, which is relatively inexpensive in that it requires a rather small amount of material for the fabrication thereof, which is quickly and easily secured to a tube socket and mounted upon a chassis, and which serves as a vibration isolator between the chassis and tube socket.

Yet a further object is that of providing a mounting component in the form of a collar having a longitudinally extending passage therethrough equipped with fastener structure for automatically securing such component to a tube socket inserted into the passage thereof, the collar being adapted to be inserted into an opening provided therefor in a chassis element and to elastically grip the edges of such opening to anchor the mounting component therein. Additional advantages and objects of the invention will become apparent as the specification develops.

Embodiments of the invention are illustrated in the accompanying drawing, in which—

Figure 2:
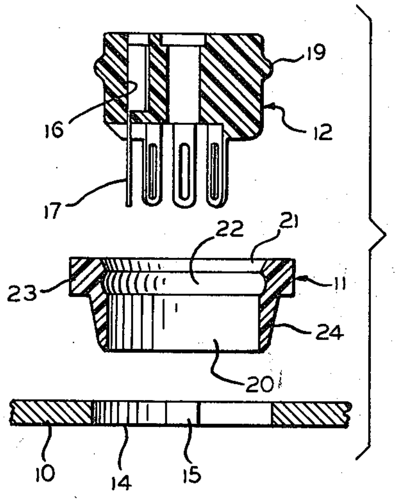
Figure 3:
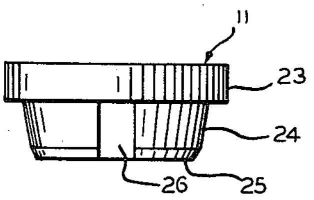
Figure 6:
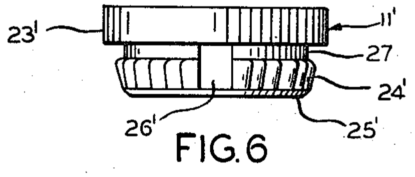
Figure 4:
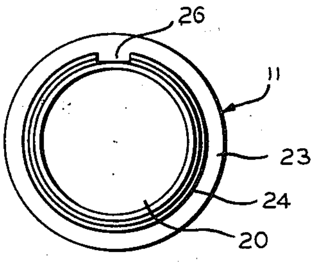
Figure 7:
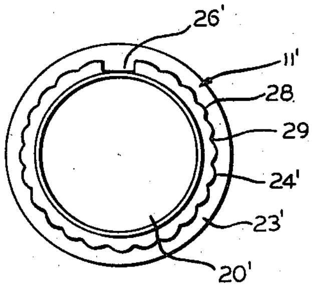
Figure 5:
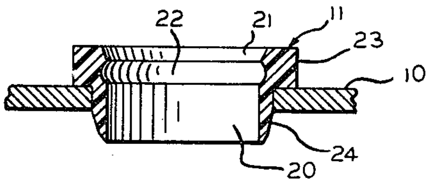
Figure 8:
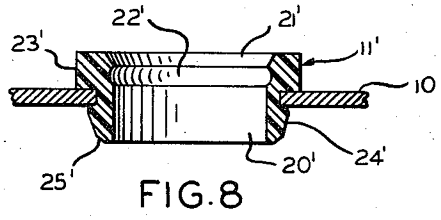

FIGURE 1 is a broken side view in elevation of a tube-equipped socket and mounting component positioned within a chassis element; FIGURE 2 is an enlarged, vertical sectional view illustrating a tube socket, mounting component, and chassis element in spaced apart relation; FIGURE 3 is an enlarged, side view in elevation of the mounting component shown in FIGURES 1 and 2; FIGURE 4 is a bottom plan view of the mounting component shown in FIGURE 3; FIGURE 5 is a vertical sectional view of the mounting component in position within an opening provided therefor in a chassis element; FIGURE 6 is a side view in elevation of a modified mounting component; FIGURE 7 is a bottom plan view thereof; and FIGURE 8 is a vertical sectional view illustrating the modified mounting component in position within an opening provided therefor in a chassis element .

The structure illustrated in FIGURE 1 includes a chassis 10, a mounting component 11, a tube socket 12, and a tube 13. The chassis 10 may be wholly conventional and, as in the specific illustration, formed of metal and may in such case serve as the ground for a circuit provided therealong. The chassis 10 has one or more openings 14 cut therethrough, and in the customary case each of such openings will be substantially circular. If desired, each of the openings 14 may be provided with an indexing or polarizing means, such as the inwardly extending tongue 15 which is adapted to cooperate with the mounting component 11 as will be described hereinafter.

For the most part the socket 12 is substantially conventional, and in the form shown is a unit molded from one of the well known synthetic thermosetting resin plastics having good dielectric properties which are used for this purpose. Consequently, the tube socket 12 is a relatively rigid member, and is provided with a plurality of passages 16 therein—each of which is equipped with a pin or terminal 17 adapted along the projecting tail thereof to be soldered or otherwise connected with an electric conductor, and adapted also to receive a pin 18 of the tube 13 and frictionally grip such pin to establish an electric connection therewith. The socket 12 is provided intermediate its top and bottom surfaces with locking structure in the form of an outwardly extending bead or rib 19 which will cooperate with the mounting component 11 in the manner described hereinafter. The tube 13 is wholly conventional, and in itself forms no part of the present invention.

The mounting component 11 is in the form of a longitudinally extending collar or sleeve having a passage 20 extending longitudinally therethrough. In the form shown, the passage 20 is substantially cylindrical and therefore is adapted to receive a substantially cylindrical socket 12 therein. At its upper end, the passage 20 is flared outwardly (as shown at 21) to facilitate insertion of the socket thereinto, and intermediate its ends the passage 20 is provided with locking structure which in the present instance is in the form of an outwardly extending channel or groove 22 adapted to snugly receive the complementary locking structure or rib 19 of the tube socket therein.

Adjacent its upper end, the mounting component 11 is equipped with laterally extending stop structure in the form of an annular flange 23 that provides a bearing surface for pressing the component into position within the opening 14, and at the same time it serves as a limiting device adapted to engage the chassis 10 to define the maximum extent of insertion of the component 11 into the opening 14. The outer surface 24 of the component 11 below the flange 23 has an inverted, generally frusto-conical configuration and tapers inwardly and downwardly slightly, which provides several advantages: First, it facilitates insertion of the component into the opening 14; second, it accommodates slight variations in the diameter of the opening 14 and/or the outer dimensions of the mounting component along such outer surface thereof; third, it affords incremental engagement and progressive deformation of the mounting component along the outer surface thereof during insertion of the component into the opening 14; and fourth, it permits use of the mounting component with chassis of various thickness.

If desired, the lower end of the outer tapered surface 24 may have a slightly greater taper at its lower end, as shown best at 25 in FIGURE 3. It will be apparent that if the opening 14 has polarizing means such as the tongue 15, the mounting component 11 along the surface 24 thereof will be provided with corresponding polarizing means, such as the slot or channel 26 which is adapted to receive the tongue 15 therein. The mounting component 11 may be formed of a material that is somewhat resilient or elastically deformable so that insertion thereof into an opening 14 of slightly smaller diameter than at least the dimensionally greatest diameter of the outer surface 24 will effect an elastic deformation of the mounting component at least along the outer surface 24 thereof, which will develop a frictional force between the edges of the opening 14 and contiguous portions of the outer surface 24 sufficient to anchor or lock the mounting component in position within such opening. Any one of a number of synthetic resin plastic materials, preferably having good dielectric properties, may be used; and an example thereof is nylon.

In use of the arrangement, it will be usual for a socket 12 to be mounted first within the component 11; and this is accomplished by moving the socket downwardly as seen in FIGURE 2 and into the passage 20 to effect an interconnection of the complementary locking structures respectively provided by the socket and mounting component. More specifically, and with respect to the exemplary embodiment illustrated, the socket 12 will be locked within the mounting component 11 when the rib 19 snaps into the channel 22.

Next, the mounting component 11 with the socket 12 mounted therein is inserted into the opening 14 with the tongue 15 in alignment with the slot 26. The component 11 will be forceably pressed into the opening 14 until the forces developed by the elastic deformation of the component are sufficient to anchor the same within the opening, and this will occur usually when the flange 23 is in substantial abutment with the upper surface of the chassis 10, as shown in FIGURE 5.

The modified mounting component shown in FIGURES 6 through 8 is generally similar to the component heretofore described, and is denoted generally with the numeral 11'. The component 11' has a longitudinally extending passage 20' therein flaring outwardly at its upper end, as shown at 21'. Within the passage and intermediate the ends thereof is locking structure 22' in the form of an annular channel, and the component is equipped with laterally projecting stop structure such as the annular flange 23'. Thus far, the modified component 11' is substantially identical with the component 11, and is adapted to receive the socket 12 therein as described hereinbefore.

The outer surface 24' tapers inwardly at its lower end at a relatively sharp angle (as shown at 25'), and is provided with a slot or groove 26' adapted to receive the polarizing tongue 15 therein when the mounting component is inserted into the opening 14 of the chassis 10, as shown in FIGURE 8. The outer surface 24', from the tapered end 25' to substantially the midpoint therealong, tapers upwardly and outwardly and terminates adjacent such midpoint to define the lower wall or extremity of a channel or groove 27—the diameter of which is substantially the same as or slightly less than that of the opening 14, and the vertical dimension of which is substantially the same as the thickness of the chassis 10. The outer surface 24' throughout the intermediate tapered portion thereof is defined by a plurality of alternately arranged ribs 28 and recesses 29 radially oriented and circumferentially spaced about the surface 24'.

In use of the modified component 11', it will usually be assembled first with the socket 12 and thereafter inserted into the opening 14 of the chassis 10. As the outer surface 24' of the component moves downwardly through the opening 14, the component, or at least the outer surface 24' and ribs 28 thereof, will be elastically deformed to permit such movement of the component into the opening. When the recessed channel 27 is aligned with the edges of the opening 14, the forces developed by such deformation will tend to restore the mounting component to its initial condition, whereupon the component will be anchored to the chassis 10 (as shown in FIGURE 8) because the flange 23' will prevent movement of the component in one direction and the ribs 28 will prevent displacement of the component in the opposite direction.

It will be apparent that each of the mounting components is effective to mount a tube socket or similar element upon a chassis quickly and easily and without the use of rivets, bolts, and similar fasteners, and that the mounting components will attenuate the transmission of vibration from the chassis 10 to the socket 12—with the degree of attenuation being related to the resilience of the component. Additionally, the components since formed of insulating material serve to electrically isolate the socket 12 and terminals thereof from the chassis 10, and the insulating characteristics may be selectively varied by simply altering the longitudinal dimension of the mounting components.

While in the foregoing specification embodiments of the invention have been set forth in considerable detail for purposes of making an adequate disclosure thereof, it will be apparent to those skilled in the art that numerous changes may be made in such details without departing from the spirit and principles of the invention.

I claim:

1. A mounting component for securing a tube socket or the like in an opening provided therefor in a chassis element, said mounting component including a collar having a longitudinally extending passage therethrough, a tube socket of insulating material secured within said passage, said collar and said tube socket having cooperating locking elements for securing said parts in pre-assembly, stop structure extending laterally outwardly from said collar adjacent the upper end portion thereof and being displaced toward adjacency with a surface of such chassis upon insertion of said collar into the chassis opening thereof, said collar being provided with an inwardly and downwardly extending taper along the outer surface thereof below said stop structure to facilitate insertion of said collar into such opening and to provide progressively increasing degrees of frictional engagement of said collar with the marginal edges of such opening during such insertion, and the outer surface of said collar below said stop structure being elastically deformable upon forcible engagement thereof with the opening-defining edges of such chassis to anchor said collar within such opening.

2. A mounting component for securing a tube socket or the like in an opening provided therefor in a chassis element, said mounting component including elastically deformable collar having a longitudinally extending passage therethrough, said collar having an annular groove adjacent said passage, a tube socket of insulating material secured within said passage, said tube socket having an annular rib element in complementary engagement within said annular groove for securing said parts in preassembly, stop structure extending laterally outwardly from said collar adjacent the upper end portion thereof and being displaced toward adjacency with a surface of such chassis upon insertion of said collar into the chassis opening thereof, said collar being provided with an inwardly and downwardly extending taper along the outer surface thereof below said stop structure to facilitate insertion of said collar into such opening and to provide progressively increasing degrees of frictional engagement of said collar with the marginal edges of such opening during such insertion, and the outer surface of said collar below said stop structure being elastically deformable upon forcible engagement thereof with the opening-defining edges of such chassis to anchor said collar within such opening.

References Cited in the file of this patent

UNITED STATES PATENTS

| | | |
|---|---|---|
| 2,441,907 | Schmitt | May 18, 1948 |
| 2,590,001 | Fox | Mar. 18, 1952 |
| 2,872,655 | Damon | Feb. 3, 1959 |
| 2,938,188 | Lazzery | May 24, 1960 |